United States Patent [19]

Molgaard et al.

[11] 4,290,553
[45] Sep. 22, 1981

[54] ROTARY KNOB FOR THERMOSTATIC VALVES OF RADIATORS

[75] Inventors: Aage Mølgaard, Nordborg; Niels P. G. Graversen, Augustenborg, both of Denmark

[73] Assignee: Danfoss A/S, Denmark

[21] Appl. No.: 149,498

[22] Filed: May 13, 1980

[30] Foreign Application Priority Data

May 28, 1979 [DE] Fed. Rep. of Germany ....... 2921522

[51] Int. Cl.³ .............................................. F24F 11/06
[52] U.S. Cl. .................................... 236/42; 236/99 R
[58] Field of Search ............. 236/42, 43, 12.16, 12.18, 236/12.19, 12.2, 12.21, 12.23, 99 R

[56] References Cited

U.S. PATENT DOCUMENTS

| | | | |
|---|---|---|---|
| 3,765,604 | 10/1973 | Trubert | 236/12 L |
| 3,955,759 | 5/1976 | Knapp | 236/12 L |
| 4,029,256 | 6/1977 | Dauga | 236/12 L |
| 4,039,126 | 8/1977 | Spies et al. | 236/42 |
| 4,089,461 | 5/1978 | Gocke | 236/42 |
| 4,216,902 | 8/1980 | Braukmann | 236/42 |
| 4,232,817 | 11/1980 | Braukmann et al. | 236/42 |

*Primary Examiner*—William E. Tapolcai, Jr.
*Attorney, Agent, or Firm*—Wayne B. Easton

[57] ABSTRACT

The invention relates to a manually setable, knob-type thermostatic control assembly for radiator valves. The knob normally has a fixed or usual setting to provide a desired temperature for a room. Occasionally the setting is temporarily changed for one reason or another and the unit must be reset to its usual setting. This is facilitated herein and in the prior art by providing index markings on the relatively rotatable members. The novelty herein, however, is in providing a cap for the rotatable knob member which carries the index marking and the cap is readily adjustable relative to rotatable member in a simple manner without detaching the cap from the knob member.

5 Claims, 7 Drawing Figures

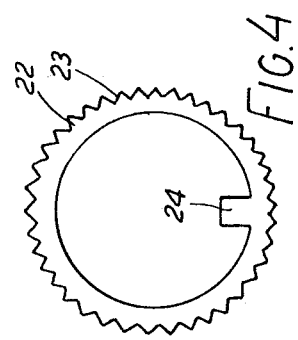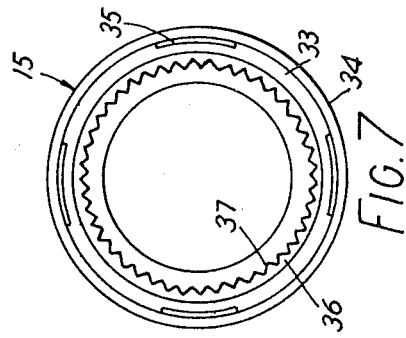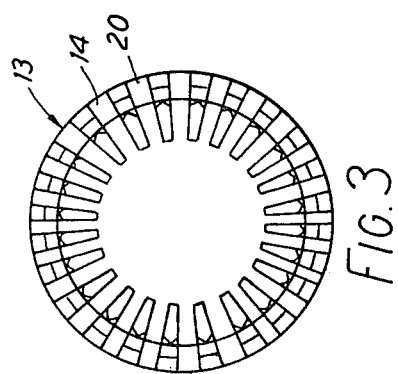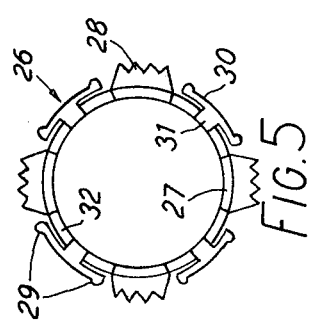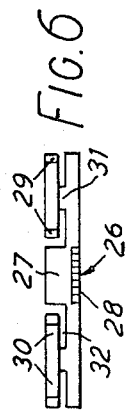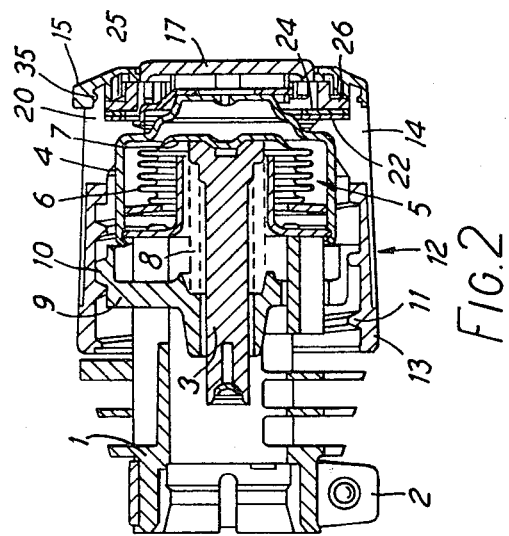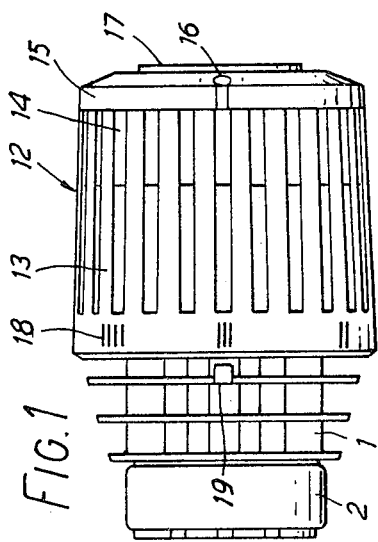

ROTARY KNOB FOR THERMOSTATIC VALVES OF RADIATORS

The invention relates to a rotary knob for thermostatic valves of radiators, comprising a hollow handle portion and a marked ring on the end thereof that bears a marking co-operating with a fixed pointer and is rotatable relatively to the handle portion, each of the handle portion and the marked ring having serrations for coupling purposes.

In a known rotary knob of this kind (DE-PS No. 11 80 592), the end of the handle portion comprises an annular rib which is interrupted by radial slots and carries internal serrations. The marked ring carries a gear ring made in one piece therewith, of which the external teeth engage the internal serrations of the handle portion. The marked ring can therefore be placed on the handle portion in different angular positions. In the installed position, the marked ring is prevented from being pulled off by resilient snap-engagement on the annular rib of the handle portion. This permits the marked ring to be adjusted even after assembly of the rotary knob by pulling it off and replacing it in a different angular position. However, such adjustment had to be effected by the heating engineer. The gear ring on the marked ring also has internal serrations which co-operate with an externally serrated abutment ring which carries a rotation-limiting stop. This abutment ring can likewise be installed in different angular positions to limit the range of adjustment of the thermostat.

It is the underlying problem of the invention to provide a rotary knob of the aforementioned kind in which adjustment of the marked ring is easier and, in particular, can be effected by a layman.

According to the invention, this problem is solved by an intermediate ring with fixed teeth engaging the one serrations and radially resilient teeth engaging the other serrations.

In this construction, the serrations of the handle portion and the marked ring are not directly interengaged but by way of the interpositioning of the intermediate ring. By reason of the resilient teeth, there can now be rotary displacement of the marked ring relatively to the handle portion without the marked ring having to be taken off. The torque required for adjustment can be selected at will by choosing the spring force of the teeth. In particular, it is not difficult to design the torque so that relative rotation is just possible by hand but the marked ring will be sure to retain its position during normal adjustment of the rotary knob. This is accounted for by the fact that during normal adjustment of the rotary knob, the manual forces are predominantly applied to the handle portion and only to a minor extent to the marked ring at the end.

This simple possibility of adjustment not only facilitates initial adjustment but also permits the user individually to set the marking to the point of comfort which to him seems to be the optimum for the room in question. For example, the middle of the scale can be set to 22° C. in a living room and 17° C. in a bedroom. In an extreme case, it suffices if the marked ring carries merely a single marking which defines this comfort point. This does not exclude the possibility of also providing conventional marking on the handle portion.

Desirably, the resilient teeth have a rounded crest. This facilitates the rotary adjustability.

Preferably, the handle portion and marked ring have internal serrations and the intermediate ring has outwardly directed teeth staggered in height. This results in a compact construction.

In a preferred embodiment, the intermediate ring comprises a base ring on which the fixed teeth are formed directly and the resilient teeth by way of circumferentially extending spring arms. Comparatively short spring arms will be sufficient so that an adequately large number of resilient teeth can be accommodated.

Preferably, each two opposed spring arms are secured to the base ring by a common support. This, again, saves space in the circumferential direction and is of particular interest for cases where the rotary knob has a relatively small diameter.

In a preferred embodiment, the circumference of the base ring is alternately provided with fixed teeth and, staggered in height, spring arms with resilient teeth as well as recesses radially inwardly of the spring arms. The recesses permit an adequately large spring displacement to be obtained. They also facilitate injection moulding in a plastics injection mould.

Further, the marked ring may have an annular groove which can be resiliently snapped onto an annular rib at the end of the handle portion and the inner wall of which has the serrations on the inside. This likewise contributes to a compact construction.

In a rotary knob in which at least one externally serrated abutment ring carries a rotation-limiting stop and is coupled to the rotary knob by internal serrations against relative rotation, it is advisable for the abutment ring to be disposed below the intermediate ring and likewise engage the internal serrations of the handle portion. One set of serrations will therefore be sufficient for the abutment ring and intermediate ring.

It is also favourable for the resilient teeth to co-operate with the serrations of the marked ring. For rotary adjustment of the marked ring, this marked ring need then only be adjusted relatively to the other parts of the rotary knob. In particular, when an abutment ring is used there will be no relative rotation between it and the intermediate ring.

The invention will now be described in more detail with reference to a preferred example illustrated in the drawing, wherein:

FIG. 1 is a plan view of a thermostat attachment for a radiator and equipped with the rotary knob of the invention;

FIG. 2 is a longitudinal section of the thermostat attachment;

FIG. 3 is a plan view of the rotary portion;

FIG. 4 is a plan view of an abutment ring;

FIG. 5 is a plan view of the intermediate ring;

FIG. 6 is a partly developed view of the intermediate ring from the side, and

FIG. 7 is an underplan of the marked ring.

The thermostat attachment shown in FIGS. 1 and 2 is intended to have its foot or chassis 1 to be secured on the valve housing of a radiator valve with the aid of a clamping device 2, whereby a valve actuating rod or tappet 3 acts on the actuating pin which sealingly projects from the housing and is intended for the closure member loaded by a return spring.

Secured to the foot 1 there is the capsule 4 of a thermostatic operating element 5 of which the interior, which is also bounded by a corrugated tube 6 and a base 7, is partially filled with a vaporisable liquid. The base 7 is connected to the tappet 3 and influenced by an intended value spring 8 which is supported against a supporting plate 9. The outside of the latter carries parts of a screwthread 10 which co-operates with the internal thread 11 on a rotary knob 12. This rotary knob comprises a substantially cylindrical handle portion 13 having slots 14 for the entry of air to the capsule 4, and a marked end cap or ring 15 which carries a marking 16 and surrounds a plate 17 connected to the capsule 4. The plate is provided with a fixed pointer. The rear end of the handle portion is provided with indicating numerals 18 which co-operate with a further fixed pointer 19 on the foot 1.

The end of the handle portion 13 comprises a circumferential rib 20 which is interrupted by the slot 14 and the inside of which carries internal serrations 21, only half of each tooth being present because of the slots 14.

Two abutment rings 22 are provided, one of which is shown in FIG. 4. It comprises external serrations 23 which can co-operate with the internal serrations 21 and an inwardly projecting abutment 24 which co-operates with an abutment 25 secured to the capsule 4. These abutment rings can be so inserted that a given angle of rotation is produced for the rotary knob 12.

FIGS. 5 and 6 show an intermediate ring 26 which comprises a base ring 27 having fixed teeth 28 and resilient teeth 29 alternating in the circumferential direction. The resilient teeth are at the ends of spring arms 30 which are offset in height relatively to the fixed teeth 28. Each two spring arms 30 are secured to the base ring 27 by way of a common support 31. The base ring 27 is provided with recesses 32 radially inwardly of the spring arms. The fixed teeth 28 co-operate with the internal serrations 21 of the handle portion 13.

The marked ring 15 comprises an annular groove 33 which is adapted to engage over the annular rib 20 of the rotary knob.

At the inside of the outer wall 34 there are small beads 35 which are disposed in one plane and are adapted to engage in a complementary annular groove of the annular rib 20. Internal serrations 37 are provided on the inside of the internal wall 36. They co-operate with the resilient teeth 29 of the intermediate ring 26. Since these teeth have a rounded crest and are resilient, it is, in conjunction with the inclination of the teeth of the internal serrations 37, possible to turn the marked ring relatively to the handle portion 13 after a certain torque is exceeded, without the need for taking the marked ring off.

It is now possible to set the single marking 16 independent of the numerical scale at the back so that the comfort point in the room in question is reached on alignment with the fixed pointer of the plate 17. The user therefore immediately knows to which position the rotary knob must be turned back if the valve had previously been turned off such as for the purpose of ventilating the room.

By way of a general summary, the valve unit as best shown in FIG. 1 has the foot or chassis part 1 thereof adapted to be attached to a radiator valve (not shown) with clamping device 2. The chassis part 1 is fixed relative to the radiator valve to which is attached and a valve adjusting knob 13 is rotatable relative to the chassis 1. Index marking 18 and 19 on the knob 13 and chassis indicate the setting of the knob relative to the chassis. The ring or cap 15 is rotatably adjustable relative to the knob 13 and the index marking 16 on the cap 15, when viewed relative to the knob marking 18, denotes the angular position of the cap 15 relative to the knob 13.

In use, the cap 15 is set relative to the knob 13 so that when the knob 13 is in its normally desired setting relative to chassis 1, the cap marking 16 is aligned with the marking 19 of chassis 1. After the knob 12 is turned to some desired temporary setting it can be turned back to its permanent setting by simply aligning the marking 16 of cap 15 with the chassis marking 19.

The adjustability between knob 13 and the cap 15 is accommodated by the ring 26 of FIGS. 5 and 6 as explained above wherein the ring is fixedly attached to knob 13 by fixed teeth 28 and adjustably attached to the cap 15 by the resilient teeth 29.

What is claimed is:

1. A thermostatic control assembly for radiator valves, comprising, a chassis member adapted to be attached to a valve casing, said chassis having an index marking, a generally cylindrically shaped knob surrounding said chassis member, said knob having index marking which is related to said index marking on said chassis, thread means between said knob and said chassis member to facilitate axial movement for said knob, a thermostatic operating unit disposed internally of said knob and attached thereto, said operating unit having an axially movable valve actuating rod, an end cap, said end cap and said knob having internal serrations for coupling purposes, a ring member for adjustably attaching said cap to said knob, said ring member having circumferentially arranged sets of rigid and resilient teeth engaging said serrations, said resilient teeth allowing relative rotatable adjustments between said knob and said cap without relative axial movement therebetween to allow adjustments involving said index markings of said chassis member and said knob.

2. A control assembly according to claim 1 characterized in that said resilient teeth have rounded crests.

3. A control assembly according to claim 1 characterized in that said sets of teeth are outwardly directed and arranged at different levels.

4. A control assembly according to claim 3 characterized in that said rigid teeth are formed directly on said ring member, and circumferentially extending spring arms forming supports for said resilient teeth.

5. A control assembly according to claim 1 characterized in that annular rib and groove means are provided between said knob and said end cap to provide a resilient snapping connection.

* * * * *